(12) United States Patent
Moller

(10) Patent No.: US 6,360,029 B1
(45) Date of Patent: Mar. 19, 2002

(54) METHOD AND APPARATUS FOR VARIABLE MAGNIFICATION OF AN IMAGE

(75) Inventor: Christian Henrik Luja Moller, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/437,493

(22) Filed: May 9, 1995

Related U.S. Application Data

(63) Continuation of application No. 08/200,839, filed on Feb. 22, 1994, now abandoned, which is a continuation of application No. 07/897,180, filed on Jun. 11, 1992, now abandoned.

(51) Int. Cl.[7] ................................................. G06K 9/32
(52) U.S. Cl. ........................ 382/298; 345/671; 358/451
(58) Field of Search ................................. 382/293, 299, 382/300; 348/581, 582; 358/451; 345/132, 660, 667, 671

(56) References Cited

U.S. PATENT DOCUMENTS

| | | | |
|---|---|---|---|
| 4,153,896 A | | 5/1979 | White ........................ 340/731 |
| 4,503,469 A | | 3/1985 | Kato ........................... 358/287 |
| 4,532,605 A | | 7/1985 | Waller ........................ 364/900 |
| 4,569,081 A | | 2/1986 | Mintzer et al. ............... 382/47 |
| 4,631,751 A | | 12/1986 | Anderson et al. ............. 382/47 |
| 4,633,503 A | | 12/1986 | Hinman ....................... 382/47 |
| 4,656,664 A | | 4/1987 | Anderson et al. ............. 382/47 |
| 4,675,830 A | | 6/1987 | Hawkins ..................... 364/518 |
| 4,686,580 A | * | 8/1987 | Kato et al. .................... 382/47 |
| 4,698,778 A | | 10/1987 | Ito et al. ...................... 364/518 |
| 4,701,808 A | | 10/1987 | Nagashima .................. 358/287 |
| 4,703,353 A | * | 10/1987 | David .......................... 382/47 |
| 4,712,140 A | * | 12/1987 | Mintzer et al. ............... 382/47 |
| 4,754,270 A | | 6/1988 | Murauchi .................... 340/731 |
| 4,774,581 A | | 9/1988 | Shiratsuchi ................. 358/180 |

(List continued on next page.)

FOREIGN PATENT DOCUMENTS

| JP | 63-283956 | 11/1988 |
|---|---|---|
| JP | 01-117568 | 5/1989 |
| JP | 01-136465 | 5/1989 |

OTHER PUBLICATIONS

"Reduction of Image", by I. Kitazawa et al, *IBM Technical Disclosure Bulletin*, Vo. 27, No. 5, Oct. 1984, pp. 3019–3020.

*Primary Examiner*—Bhavesh Mehta
(74) *Attorney, Agent, or Firm*—Paul S. Drake; Volel Emile; Leslie A. Van Leeuwen

(57) ABSTRACT

A method of expanding an image stored in a first array including the steps of separating the first array into a plurality of rows, each row having a first plurality of data elements, each element having a value, and separately expanding each row from a first plurality of data elements in the first array to a second plurality of data elements in a second array including the steps of correlating each of the first plurality of data elements to at least one of the second plurality of data elements, and distributing the value of selected elements of the first plurality of data elements to correlated data elements of the second plurality of data elements. In addition, an apparatus for expanding an image stored in a first array including apparatus for separating the first array into a plurality of rows, each row having a first plurality of data elements, each element having a value, and apparatus for separately expanding each row from a first plurality of data elements in the first array to a second plurality of data elements in a second array including apparatus for correlating each of the first plurality of data elements to at least one of the second plurality of data elements, and apparatus for distributing the value of selected elements of the first plurality of data elements to correlated data elements of the second plurality of data elements.

16 Claims, 6 Drawing Sheets

U.S. PATENT DOCUMENTS

| | | | |
|---|---|---|---|
| 4,809,083 A | 2/1989 | Nagano et al. | 358/287 |
| 4,827,433 A | 5/1989 | Kamon | 364/523 |
| 4,833,625 A | 5/1989 | Fisher et al. | 364/518 |
| 4,834,374 A | 5/1989 | Nakamura et al. | 273/1 |
| 4,878,126 A * | 10/1989 | Ichikawa | 358/451 |
| 4,907,284 A | 3/1990 | Ohuchi | 382/47 |
| 4,941,186 A * | 7/1990 | Massmann et al. | 382/54 |
| 4,972,264 A | 11/1990 | Bishop et al. | 358/183 |
| 5,008,752 A * | 4/1991 | Van Nostrand | 348/581 |
| 5,048,101 A * | 9/1991 | Kurosu et al. | 382/47 |

\* cited by examiner

METHOD AND APPARATUS FOR VARIABLE MAGNIFICATION OF AN IMAGE

RELATED PATENT APPLICATIONS

This is a continuation of application Ser. No. 08/200,839 filed Feb. 22, 1994, now abandoned, which is a continuation of Ser. No. 07/897,180 filed Jun. 11, 1992 now abandoned.

This patent application is related to patent application Ser. No. 07/897,161, filed Jun. 11, 1992 (concurrently with the present application), entitled "METHOD AND APPARATUS FOR VARIABLE MINIFICATION OF AN IMAGE", now abandoned, hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to image information processing and more particularly to performing variable magnification of an image.

BACKGROUND ART

The prior art includes several methods and apparatus for magnifying images. Many of these are described below.

U.S. Pat. No. 4,153,896 teaches compressing or expanding an image such as a symbol, character or text, in a first direction followed by compressing or expanding the image in a second direction. The image to be compressed or expanded is divided up by a grid defining a large number of square areas in an image wherein each area is represented by a clock cycle in each direction. The compression or expansion is accomplished by utilizing an averaging circuit which provides a signal indicating the value of the resulting image.

U.S. Pat. No. 4,503,469 teaches a picture image enlarging/reducing system wherein image magnification by a desired factor is achieved by first enlarging the image by an integer factor greater than the desired factor and then multiplying the enlarged image by a correction coefficient corresponding to the ratio of the desired factor to the integer factor.

U.S. Pat. No. 4,532,605 is directed to forming a zoom operation on a displayed image and maintaining a fixed width of each line of the zoomed image regardless of the degree of magnification of the zoomed image.

U.S. Pat. No. 4,569,681 is directed to enlarging a binary image by inserting expansion rows and columns between previously existing rows and columns and setting the value of the expansion rows and columns equal to the value of one or both of the adjacent previously existing rows and columns.

U.S. Pat. No. 4,631,751 is directed to enlarging a binary image by rotating the image 90 degrees, inserting expansion rows into the image, building the expansion rows based upon the values of the neighboring rows, rotating the image another 90 degrees, inserting additional blank rows, and filling those blank rows based upon the values of adjacent rows.

U.S. Pat. No. 4,633,503 is directed to a video zoom processor by mapping each input pixel into at most four adjacent output pixels wherein each sampled input pixel is skilled, segmented and accumulated into four locations in the image memory.

U.S. Pat. No. 4,675,830 is directed to a method for producing scalable contour data. The method stretches and compresses character contours to bring specified contour points into proper alignment with a bit map grid.

U.S. Pat. No. 4,698,778 is directed to variable magnification of half tone images such as photographs or painted pictures. This is accomplished by utilizing one of a plurality of mother matrix patterns that is specified in accordance with the desired magnification.

U.S. Pat. No. 4,754,270 is directed to generating a variable size image on a display from a matrix of horizontal and vertical pixel information stored in memory by utilizing vertical and horizontal address counters which are incremented based on the desired magnification.

U.S. Pat. No. 4,774,581 is directed to a digital video zoom system which includes circuitry for writing image samples into a memory at a standard rate and for reading samples from the memory at a reduced rate.

U.S. Pat. No. 4,809,083 is directed to enlarging or reducing an image at a desired magnification in a facsimile, copying machine or the like. This is accomplished by continuously varying a ratio of a reading resolution to a recording density.

U.S. Pat. No. 4,827,433 is directed to changing magnification of image data applicable to a digital copier, facsimile or the like. This is accomplished by sampling original image data at a predetermined rate based on the desired magnification.

U.S. Pat. No. 4,833,625 is directed to an image viewing station wherein digitized image data at any size from any different modalities is stored in an original format and can be magnified or minified for display to a user. Magnification is performed by producing interpolated image data for each pixel of a magnified image based on the weighted sum of grey levels present of each pixels four nearest neighboring pixels, including pixels from other rows or columns. Minification is performed by discarding pixels to achieve the desired minification.

DISCLOSURE OF THE INVENTION

The present invention includes a method of expanding an image stored in a first array including the steps of separating the first array into a plurality of rows, each row having a first plurality of data elements, each element having a value, and separately expanding each row from a first plurality of data elements in the first array to a second plurality of data elements in a second array including the steps of correlating each of the first plurality of data elements to at least one of the second plurality of data elements, and distributing the value of selected elements of the first plurality of data elements to correlated data elements of the second plurality of data elements. In addition, the present invention includes an apparatus for expanding an image stored in a first array including apparatus for separating the first array into a plurality of rows, each row having a first plurality of data elements, each element having a value, and apparatus for separately expanding each row from a first plurality of data elements in the first array to a second plurality of data elements in a second array including apparatus for correlating each of the first plurality of data elements to at least one of the second plurality of data elements, and apparatus for distributing the value of selected elements of the first plurality of data elements to correlated data elements of the second plurality of data elements.

A further understanding of the nature and advantages of the present invention may be realized by reference to the remaining portions of the specification and the drawings.

BEST MODE FOR CARRYING OUT THE INVENTION

Figure 1:
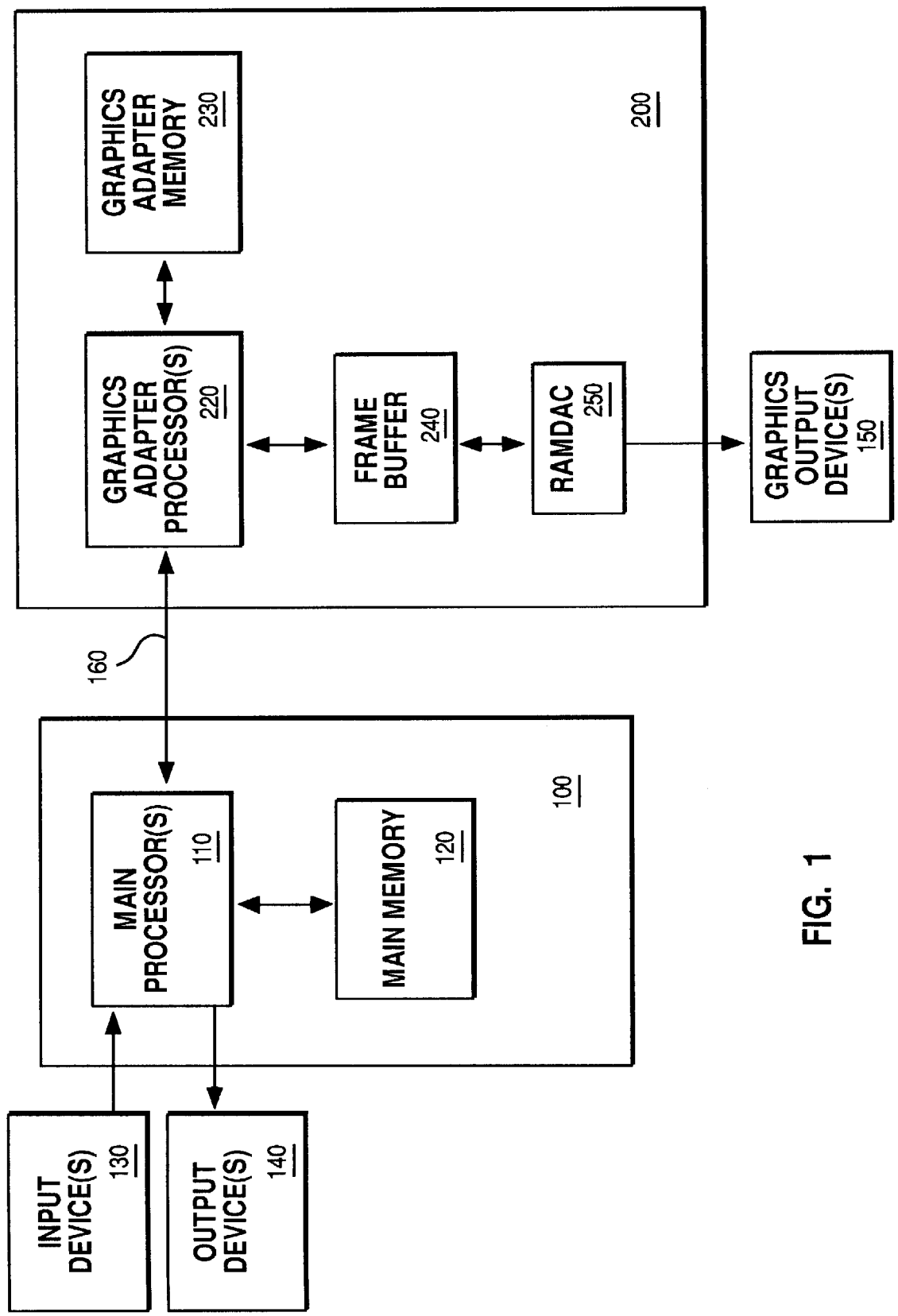
FIG. 1 is a block diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120, input device(s) 130 and output device(s) 140. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 150 such as a graphics display through a graphics adapter 200. Graphics adapter 200 receives instructions regarding graphics from main processor 110 on bus 160. The graphics adapter then executes those instructions with graphics adapter processor (s) 220 coupled to a graphics adapter memory 230. The graphics processors in the graphics adapter then execute those instructions and updates frame buffer(s) 240 based on those instructions. Graphic processors 220 may also include specialized rendering hardware for rendering specific types of primitives to be rendered. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
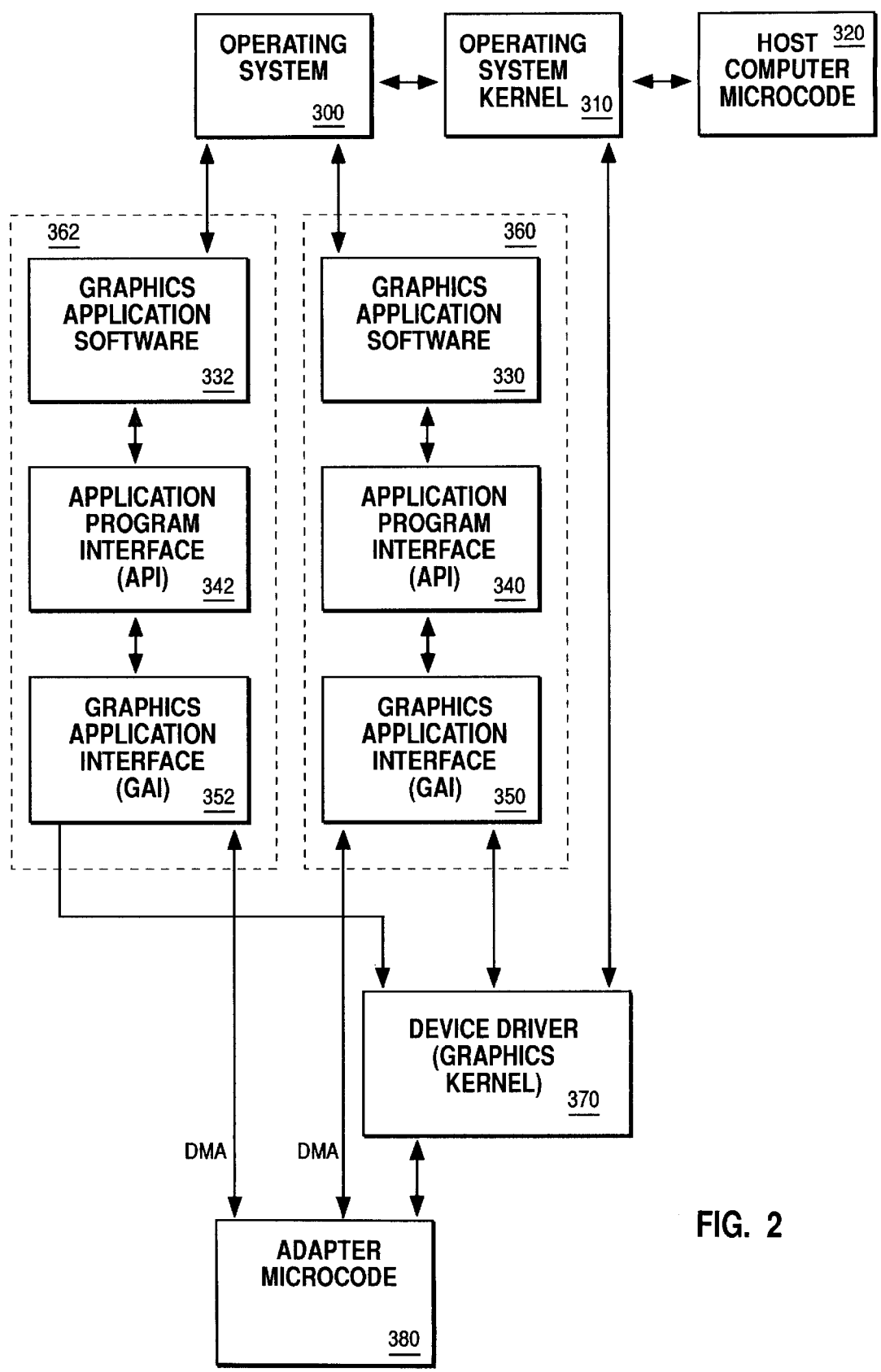
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API is no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 reside on and are executed by the host computer. However, the adapter microcode 380 resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window. The adapter microcode then breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified. This also presents a difficulty when trying to zoom a displayed image in the window. In a typical three dimensional model, when a user has an image displayed in a window, a complicated and sometimes time consuming process is followed.

In the preferred embodiment, the zoom technique will be utilized in hardware in the graphics adapter processor. This approach is extremely quick but would probably necessitate specialized hardware. This would allow for rapid zooms of observed images displayed by the graphics adapter. The zoom technique could also be utilized in many other locations such as the adapter microcode which is close to the adapter frame buffer. This approach would also be relatively quick and fairly easy to implement. In addition, the zoom technique would be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. As would be obvious to one of ordinary skill in the art, the present technique would be applied in many other locations within the host computer or graphics adapter.

Figure 3:
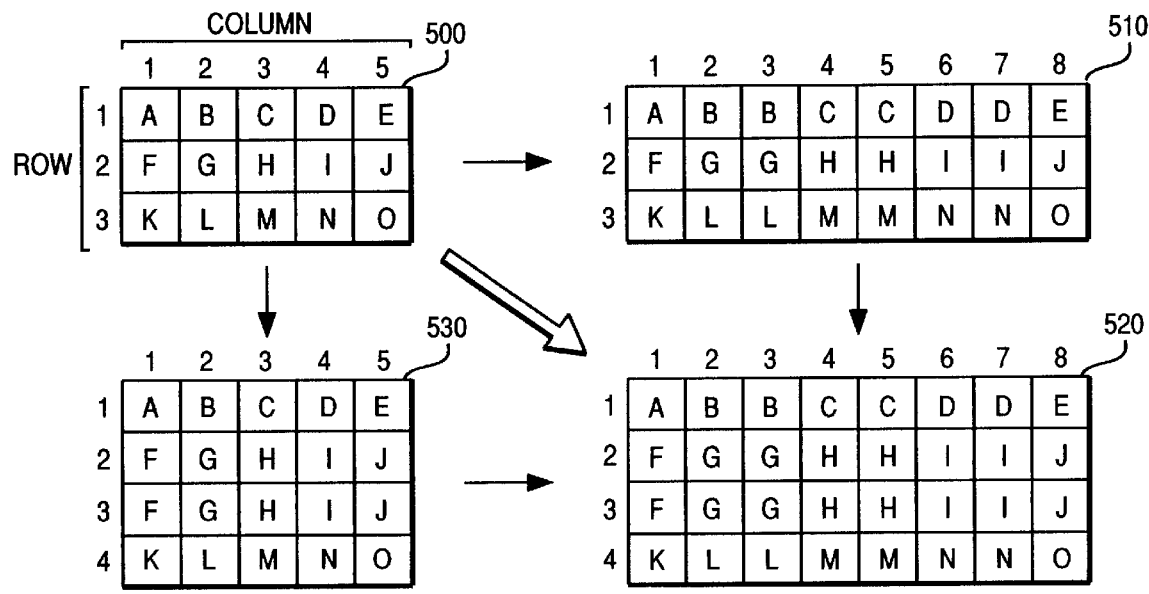
FIG. 3 is an illustration of an image having three rows and five columns being enlarged to an image having four rows and eight columns according to one embodiment of the invention.

FIG. 3 is an illustration of an image having three rows and five columns being enlarged to an image having four rows and eight columns according to one embodiment of the invention. Horizontal lines of pixels called rows may alternatively be defined as columns and vertical lines of pixels called columns may alternatively be defined as rows. Original image 500 is shown with a variable value for each pixel of the image. That is, the pixel on row 1 column 1 has a value of A which may be a grey scale value, an RGB value, or other type of value representing the portion of the image rendered by that pixel.

To perform the zoom, original image 500 is expanded widthwise into calculated image 510. Calculated image 510 is subsequently expanded heightwise into new rendered image 520. In the alternative, rendered image 500 may be first expanded heightwise into calculated image 530 and subsequently expanded widthwise into new rendered image 520.

Figure 4:
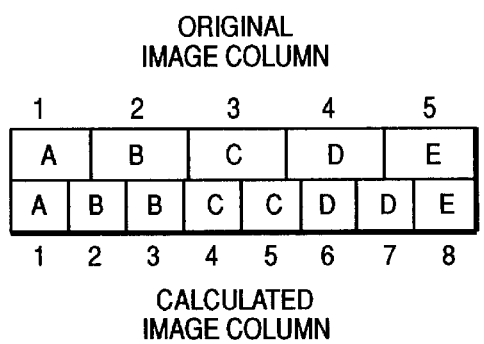
FIG. 4 illustrated an expansion of a row of an image.

The image is expanded widthwise or heightwise one row or column at a time. The expansion of a row can be understood, as shown in FIG. 4, by imagining the first row of pixels on the original image 500 being placed on a rubber band which is the stretched and placed over the first row of the calculated image 510.

The end (columns 1 and 5) pixels of row 1 map directly onto the end (columns 1 and 8) pixels of the calculated image and pass their respective pixel values to the calculated image pixels. In addition, the pixels in columns 2 and 4 of original image 500 map well to the pixels in columns 3 and 6 of calculated image 510 and pass their respective pixel values to the calculated image pixels. The pixel in column 3 of original image 500 maps well to columns 4 and 5 of calculated image 510. The pixels in columns 2 and 7 of calculated image 510 are chosen from pixels 2 and 4 of original image 500. Preferably, the pixels are distributed from the original image to the calculated image from left to right in sequential order as will be described in greater detail below with reference to FIG. 6. As a result of this distribution of pixels from the original image to the calculated image, an excellent and quick enlargement of the pixel values is performed for the row.

In subsequent steps, the remaining rows of the original image are expanded into the remaining rows of calculated image 510. After the widthwise expansion has been completed, the calculated image 510 is then enlarged heightwise into the new rendered image 520 one column at a time, similar to the widthwise expansion of each row, into new image 520.

Figure 5:
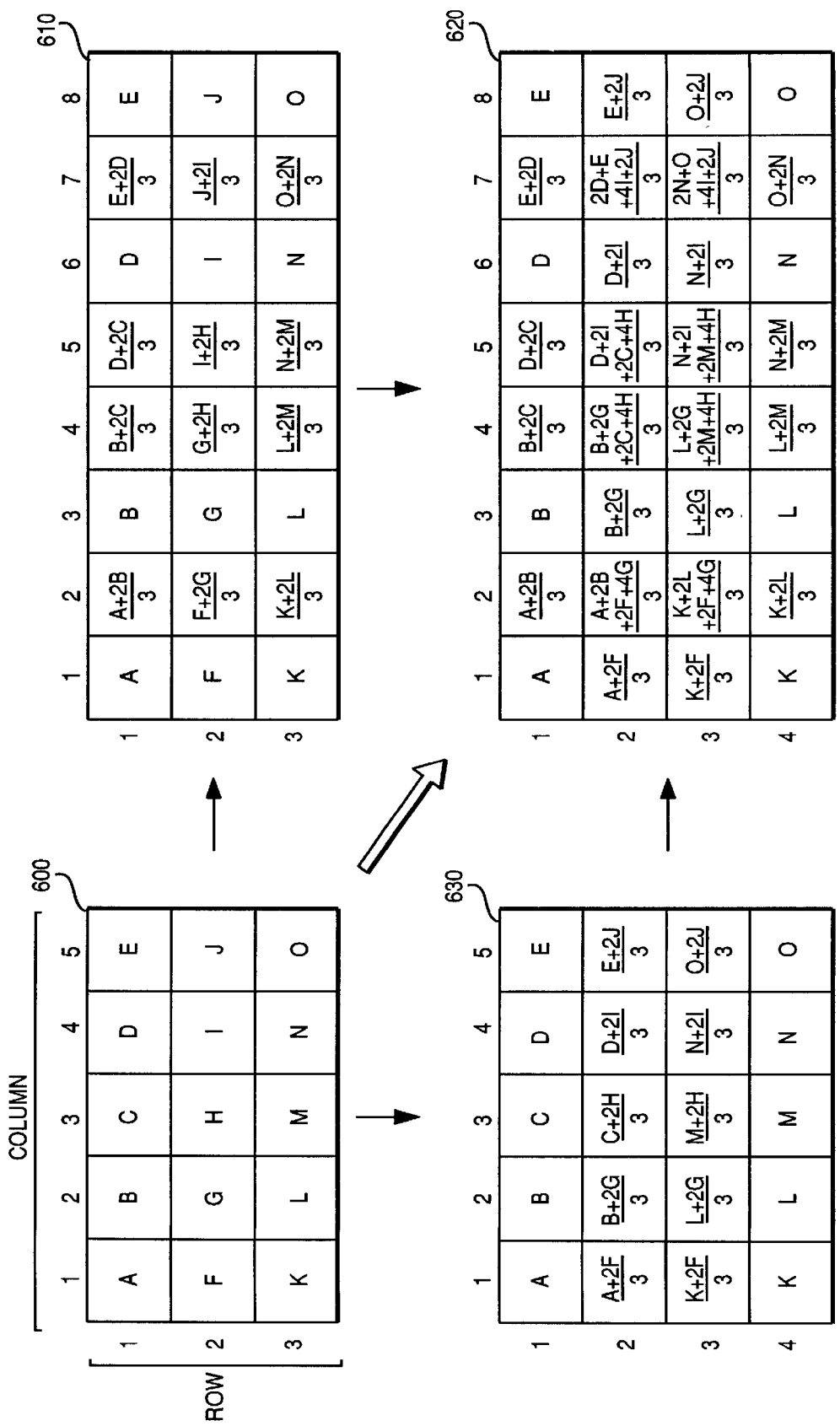
FIG. 5 is an illustration of an image having three rows and five columns being enlarged to an image having four rows and eight columns according to a preferred embodiment of the invention.

FIG. 5 is an illustration of an image having three rows and five columns being enlarged to an image having four rows and eight columns according to a preferred embodiment of the invention. Original image 600 is shown with a variable value for each pixel of the image. That is, the pixel on row 1 column 1 has a value of A which may be a grey scale value, an RGB value, or other type of value representing the portion of the image rendered by that pixel.

As described above with reference to FIG. 3, to perform the zoom, original image 600 is expanded widthwise into calculated image 610. Calculated image 610 is subsequently expanded heightwise into new rendered image 620. In the alternative, rendered image 600 may be first expanded heightwise into calculated image 630 and subsequently expanded widthwise into new rendered image 620.

The expansion of row 1 from the original image 600 to calculate image 610 is as follows. The end (columns 1 and 5) pixels of row 1 map directly onto the end (columns 1 and 8) pixels of the calculated image and pass or distribute their respective pixel values to the calculated image pixels. In addition, the pixels in columns 2 and 4 of original image 600 map well to the pixels in columns 3 and 6 of calculated image 610 and pass their respective pixel values to the calculated image pixels. The pixel in column 3 of original image 600 maps between columns 4 and 5 of calculated image 610. The pixels in columns 2, 4, 5 and 7 of calculated image 610 are then interpolated. As can be seen in the illustration, the pixel value in column 2 is interpolated as being a weighted average of the pixel values in columns 1 and 3. In addition, the pixel value in column 7 is interpolated as being a weighted average of the pixel values in columns 6 and 8. Furthermore, the pixels in columns 4 and 5 are interpolated as being a weighted average of the pixel values of columns 3, 4, 5 and 6 of the original image. Preferably, the pixels are distributed from the original image to the calculated image from left to right in sequential order as will be described in greater detail below with reference to FIG. 7. As a result of this distribution of pixels from the original image to the calculated image and the interpolation of values, an excellent enlargement of the pixel values is performed.

As described above with reference to FIG. 3, in subsequent steps, the remaining rows of the original image are expanded into the remaining rows of calculated image 610. After the widthwise expansion has been completed, the calculated image 610 is then enlarged heightwise into the new rendered image 620 one column at a time, similar to the widthwise expansion of each row, into new image 620.

Figure 6:
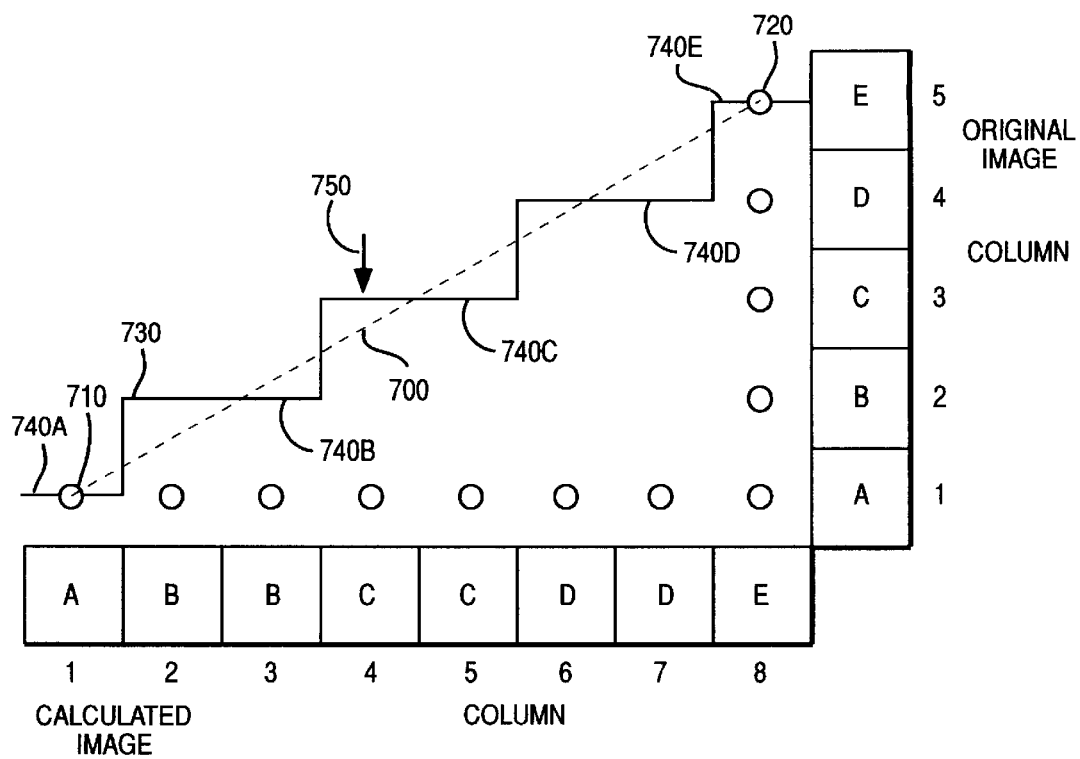
FIG. 6 illustrates how a line draw technique may be used to enlarge an image one row or column at a time for the embodiment discussed above with reference to FIG. 3.

FIG. 6 illustrates how a line draw technique may be used to enlarge an image one row or column at a time for the embodiment discussed above with reference to FIG. 3. Current line draw techniques are typically used to efficiently calculate how to draw a line in a two dimensional plane without using floating point arithmetic. However, they can be used to magnify images one row or column at a time. This process of magnifying images using a line draw algorithm for each row or column, one at a time, is quick and if an appropriate line draw algorithm is used, then floating point arithmetic may not be necessary to magnify an image.

In the illustrated example given, the five pixel wide row from the original image is the Y axis and the eight pixel wide row from the calculated image is the X axis and the line draw technique is used to determine where the values of the pixels of the original image row are to be allocated to the pixels of the calculated image row. An ideal line 700 is given for drawing a line from a beginning point 710 at the intersection of Column 1 of the original image and the calculated image to an endpoint 720 at the intersection of Column 5 of the original image and Column 8 of the calculated image. However, since discrete elements (in this case pixels) are used, the ideal line cannot be represented. Therefore, an approximation line 730 is used to approximately represent the ideal line. Many techniques exist to create such an approximation line. For example, a Bresenham algorithm may be used that has the advantage of being very quick in many computers because it does not use floating point arithmetic.

The approximation line includes several spans 740A–740E that are calculated sequentially from the starting point 710 to ending point 720. In this embodiment, each span represents which pixel value of the original image is to be allocated to which pixel value of the calculated image. For example, Column 4 of the calculated image is below span 740C as is shown by intersection point 750. Span 740C represents the pixel value in Column 3 of the original image. Therefore, Column 4 of the calculated image obtains the pixel value C as shown. Each of the pixel values are to be determined in sequential order from Column 1 through Column 8 in the present example. That is, once Column 4 of the calculated image is determined, then Column 5 of the calculated image is determined, and so forth in sequential order.

This process of allocating pixels using a line draw algorithm for each row or column, one at a time, is quick and if an appropriate line draw algorithm is used, then floating point arithmetic may not be necessary to magnify an image.

Figure 7:
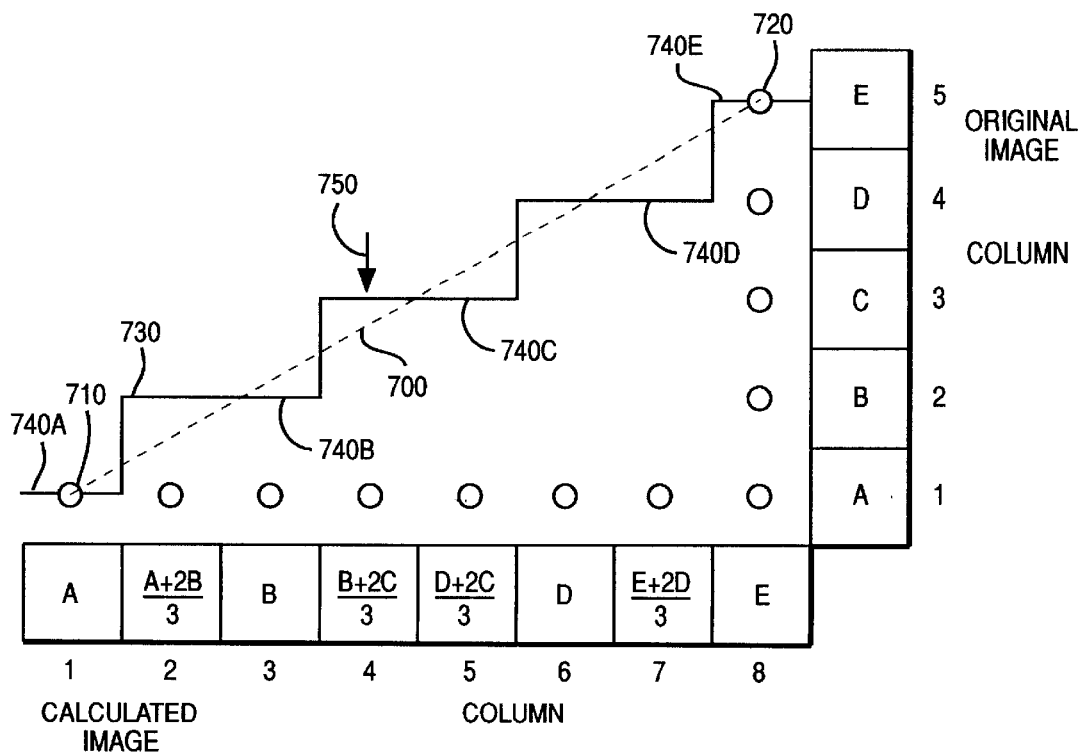
FIG. 7 illustrates how a line draw technique may be used to enlarge an image one row or column at a time for the preferred embodiment discussed above with reference to FIG. 5.

FIG. 7 illustrates how a line draw technique may be used to enlarge an image one row or column at a time for the preferred embodiment discussed above with reference to FIG. 5. The preferred embodiment also utilizes interpolation of pixel values to provide a more accurate magnification of an image. This interpolation can also be accomplished utilizing a modified line draw technique. This process of magnifying images using a line draw algorithm for each row or column, one at a time, is quick and if an appropriate line draw algorithm is used, then floating point arithmetic may not be necessary to magnify an image even if interpolation is used.

As described above with reference to FIG. 6, the five pixel wide row from the original image is the Y axis and the eight pixel wide row from the calculated image is the X axis and the line draw technique is used to determine where the values of the pixels of the original image row are to be allocated to the pixels of the calculated image row and where the values of the pixels in the calculated image are to be interpolated. An ideal line 700 is given for drawing a line from a beginning point 710 at the intersection of Column 1 of the original image and the calculated image to an endpoint 720 at the intersection of Column 5 of the original image and Column 8 of the calculated image. An approximation line 730 is used to approximately represent the ideal line.

The approximation line includes several spans 740A–740E that are calculated sequentially from the starting point 710 to ending point 720. Each span is utilized to determine which pixel values of the original image is to be allocated or interpolated to the pixel value of the calculated image. For example, Column 4 of the calculated image is below span 740C representing the pixel value in Column 3 of the original image as is shown by intersection point 750. However, Column 4 of the calculated image is also close to span 740B representing Column 2 of the original image. Therefore, Column 4 of the calculated image obtains an interpolated pixel value of (B+2C)/3 as shown based on its proximity to the span representing Column 2 of the original image. This value has been determined from the fact that intersection point 750 is located twice as close to the center of span 740C as it is to the center of span 740B. Each of the pixel values are to be determined in sequential order from Column 1 through Column 8 in the present example. That is, once Column 4 of the calculated image is determined, then Column 5 of the calculated image is determined, and so forth in sequential order.

This process of allocating and interpolating pixels using a line draw algorithm for each row or column, one at a time, is quick and if an appropriate line draw algorithm is used, then floating point arithmetic may not be necessary to magnify an image. A pseudocode routine implementing the preferred embodiment of the invention is described below with reference to Tables 1A–1D.

Figure 8:
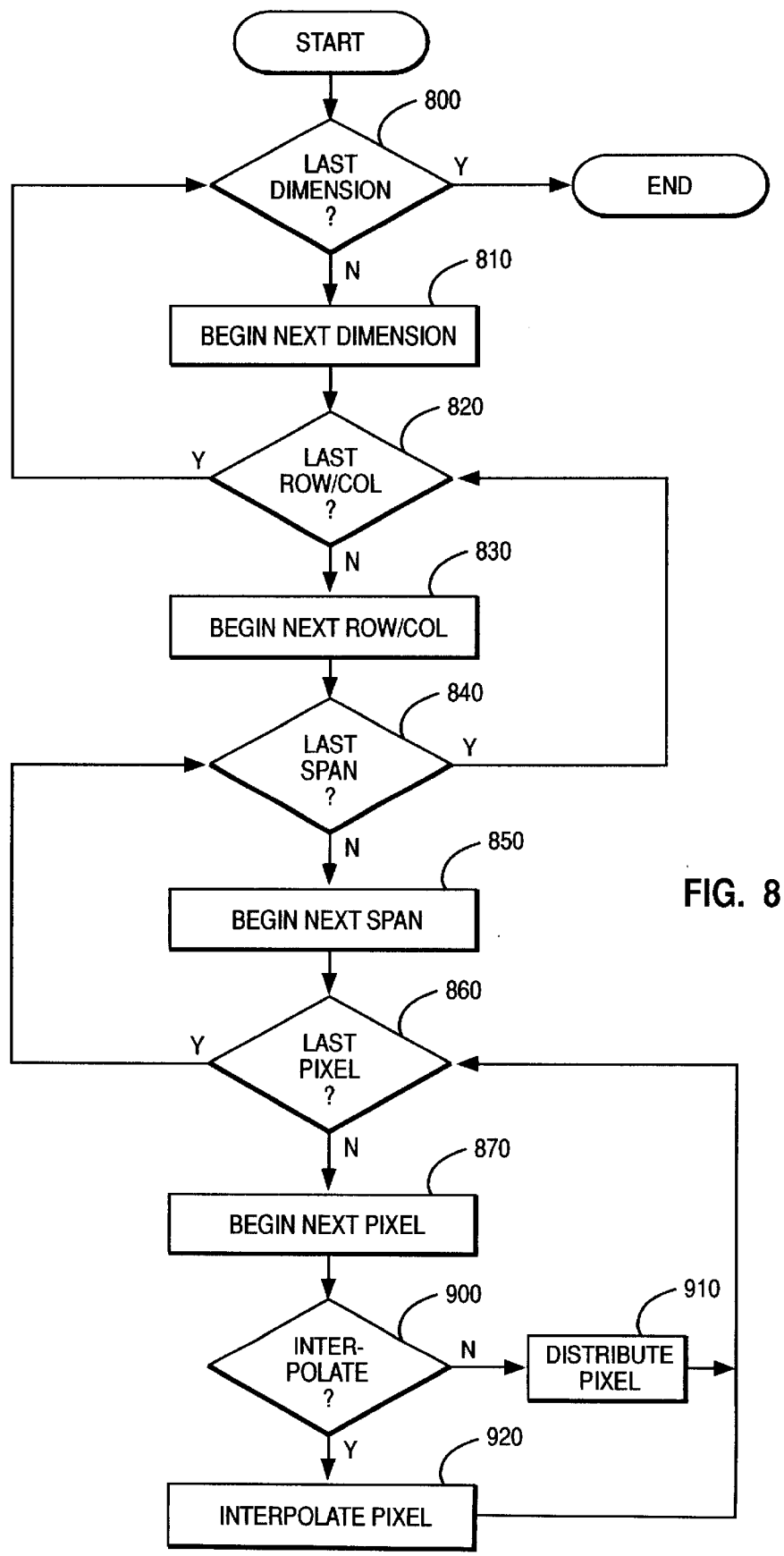
FIG. 8 is a flowchart illustrating how an image is magnified.

FIG. 8 is a flowchart illustrating how an image is magnified. It is noted that the technique is repetitive and lends itself to being performed by a line draw method. In a first step 800, it is determined whether there is a dimension to the image that needs to be magnified. That is, the flowchart is executed only if the image is to be magnified in at least one dimension and may be magnified in many dimensions, such as a three dimensional image that is described by a three dimensional array of data. Assuming there is a dimension remaining to be magnified, then in step 810, the next dimension of magnification is begun by incrementing a counter or calling a subroutine or the like. In step 820, it is determined whether this is the last row or column of data to be magnified for the current dimension being magnified. Given that this is the first execution of this step, the answer would be no and the next (first in this case) row or column of data is begun in step 830. In step 840, it is determined whether this is the last span of pixels to be magnified for the current row or column of data. Since this is the first execution of this step, the answer would be no. If yes though, execution would return to step 820 to determine whether more rows or columns of data need to be magnified. In step 850, the next span is begun by determining which pixels of the magnified image correlate to a pixel of the original image. That is, which pixels of the magnified image are closer to the pixel of the original image represented by this span than the pixels represented by the previous or next spans. In step 860, it is determined whether this is the last pixel of the magnified image for the present span. If yes, then execution returns to step 840 to determine whether this is the last span of the present row or column. If no, then the next, first in this case, pixel is begun in step 870.

In step 900, it is determined whether the current pixel of the magnified image is to be interpolated or simply receive the value of the correlating original image pixel. This determination may be based on various criteria such as proximity to the end of the span and the variation of values for neighboring original image pixels. If the pixel is not to be interpolated, then the pixel receives the value of the correlating original image pixel in step 910 and execution returns to step 860. Otherwise, the pixel receives an interpolated value in step 920 from the correlating original image pixel and surrounding original pixels or surrounding magnified image pixels. Interpolation may be based on various criteria such as proximity of surrounding original image pixels. Once completed, execution returns to step 860.

In the preferred embodiment, a zoom routine is called twice to expand an image in two dimensions, once to expand the image horizontally and once to expand the image vertically. With the proper use of variables, the same routine may be used for both operations. Tables 1A–1D provide a pseudocode routine for expanding an image either horizontally or vertically depending upon the values of the variables passed to the routine. This routine has been split into four tables to allow better explanation of its functionality.

Table 1A is part of a pseudocode routine for initializing variables in preparation for performing the zoom or magnification operation. The procedure receives the following five variables: AXIS, IMAGE, IN_SIZE, OUT_SIZE and NR_STEPS. AXIS is either the value HORIZ or VERT indicating the direction of the zoom to be performed. That is, a value of HORIZ would indicate that the width of the image is being increased and a value of VERT would indicate that the height of the image is being increased. IMAGE is an array containing the original pixel data prior to the zoom. If the value of AXIS is HORIZ, then IN_SIZE provides the original width of the pixel array, OUT_SIZE provides the new width of the pixel array after the zoom, and NR_STEPS provides the height of the pixel array. If the value of AXIS is VERT, then IN_SIZE provides the original height of the pixel array, OUT_SIZE provides the new height of the pixel array and NR_STEPS provides the width of the pixel array. Space is then allocated in memory for an array called NEW_IMAGE which is to contain the pixels of the zoomed image upon completion of the zoom routine. The size of NEW_IMAGE is equal to NR_STEPS times OUT_SIZE.

Several constants necessary for performing the zoom are then calculated. SPAN_A is the first middle span length and is based on the amount the image is to be expanded. For example, an image being expanded from 4 to 9 pixels in width would have a SPAN_A of 2. SPAN_B is the second middle run length and is one less than SPAN_A. SPAN_A and SPAN_B are chosen that they are the nearest integer values above and below, respectively, the inverse of the slope of the line to be approximated. SPAN_INIT is the initial run length and is one-half of SPAN_A. SPAN_FINAL is the final run length. SPAN_INIT and SPAN_FINAL represent the portion left over at the beginning and end of the line to be approximated.

ERROR is equal to the error accumulated during the magnification process. POS_DELTA is equal to positive error correction and NEG_DELTA is equal to the negative error correction. N and R are intermediate values used for calculations. SCAN_INC is an offset value that provides the number of entries needed to get to the next entry on the same row in the array.

TABLE 1A

Initialize Zoom Variables

```
/* Copyright International Business Machines           */
/*       Corporation, 1992 All Rights Reserved         */
/*                                                     */
/* procedure zoom: receive zoom variables              */
ZOOM (AXIS, IMAGE, IN_SIZE, OUT_SIZE, NR_STEPS)
/* allocate space to store the zoomed image            */
NEW_IMAGE = Allocate (NR_STEPS * OUT_SIZE)
/* compute constants                                   */
SPAN_A = Integer (OUT_SIZE / IN_SIZE + .99999)
SPAN_B = SPAN_A - 1
SPAN_INIT = Integer (SPAN_A / 2)
R = OUT_SIZE - SPAN_A * IN_SIZE
If (SPAN_A is ODD)
  then N = R + IN_SIZE
  else N = R
If (N = 0)
  then SPAN FINAL = SPAN_INIT - 1
  else SPAN_FINAL = SPAN_INIT
NEG_DELTA = 2 * (R - IN_SIZE)
POS_DELTA = 2 * R
SPAN_A = SPAN A + 1
SPAN_B = SPAN B + 1
If (AXIS = HORIZ)
  then SCAN_INC = 1
If (AXIS = VERT)
  then SCAN_INC = NR_STEPS
/* continue to table 1B                                */
```

Table 1B is a pseudocode routine for initiating the outer loop of the zoom routine. The outer loop is performed once for each row or column, depending upon whether the zoom is horizontal or vertical. A row or column of data is then set up in working storage for use in calculations. Some loop variables are initialized for each row or column of pixels to be expanded.

TABLE 1B

Start Zoom Outer Loop for Row or Column

```
/* start outer loop that increments by row or col      */
For I = 0 to NR_STEPS by 1 do
/* set up row or column of data for zoom               */
  If (AXIS = HORIZ)
    then
      SOURCE_PIX = IMAGE + (I * IN_SIZE)
      DEST_PIX = NEW_IMAGE + (I * OUT_SIZE)
    else
      SOURCE_PIX = IMAGE + I
      DEST_PIX = NEW_IMAGE + I
/* initialization of outer loop variables              */
  LAST_H = 1 + (2 * H_INITIAL)
  AVG_IDX = 0
  LAST_IDX = 1
  LAST_PIX = SOURCE_PIX
  Copy (DEST_PIX, SOURCE_PIX)
```

TABLE 1B-continued

Start Zoom Outer Loop for Row or Column

```
    DEST_PIX = DEST_PIX + SCAN_INC
    SOURCE_PIX = SOURCE_PIX + SCAN_INC
    ERROR = N + NEG_DELTA
/* continue to Table 1C                                    */
```

Table 1C is a pseudocode routine for initiating the inner loop of the zoom routine. The inner loop is then begun for each span within the outer loop row or column of pixels. Various intermediate values are computed in preparation for linear interpolation of pixel values.

TABLE 1C

Perform Zoom Inner Loop

```
/* start inner loop that increments every span             */
    For J = 1 to IN_SIZE do
        If (ERROR < 0)
        then
            H = SPAN_B
            ERROR = ERROR + POS_DELTA
        else
            H = SPAN_A
            ERROR = ERROR + NEG_DELTA
        AVG_IDX = AVG_IDX + LAST_H + H
/* save the value of H for future use                      */
        LAST_H = H
/* prepare variables to linearly interpolate               */
        DELTA_SPAN = AVG_IDX - LAST_IDX
        DELTA_RED = SOURCE_PIX (RED) - LAST_PIX (RED)
        DELTA_GRN = SOURCE_PIX (GRN) - LAST_PIX (GRN)
        DELTA_BLU = SOURCE_PIX (BLU) - LAST_PIX (BLU)
/* continue to Table 1D                                    */
```

Table 1D is a pseudocode routine for initiating the center loop of the zoom routine. The center loop is begun for each pixel within the span. The pixel values are then calculated. Then the outer loop is returned and the final zoomed image is then returned to the calling program.

TABLE 1D

Perform Zoom Interpolate

```
/* start center loop that increments by pixel              */
    For K = 0 to infinity by 1 while
        (LAST_IDX <= AVG_IDX) do
        If LAST_IDX is EVEN
        then
            DEST_PIX (RED) = LAST_PIX (RED) +
                ((K * DELTA_RED)/DELTA_SPAN)
            DEST_PIX (GRN) = LAST_PIX (GRN) +
                ((K * DELTA_GRN)/DELTA_SPAN)
            DEST_PIX (BLU) = LAST_PIX (BLU) +
                ((K * DELTA_BLU)/DELTA_SPAN)
/* after filling a pixel, point to the next pixel          */
            DEST_PIX = DEST_PIX + SCAN_INC
            LAST_IDX = LAST_IDX + 1
        Next K
/* end of center loop                                      */
/* save data for the next pass of the inner loop           */
        LAST_PIX = SOURCE_PIX
        SOURCE_PIX = SOURCE_PIX + SCAN_INC
    Next J
/* end of inner loop                                       */
    Next I
/* end of outer loop                                       */
/* return the new array to the caller.                     */
    Return (NEW_IMAGE)
```

Although the present invention has been fully described above with reference to specific embodiments, other alternative embodiments will be apparent to those of ordinary skill in the art. For example, alternative line draw techniques or methods may be utilized. In addition, alternative interpolation techniques may be utilized. Therefore, the above description should not be taken as limiting the scope of the present invention which is defined by the appended claims.

What is claimed is:

1. A method of expanding an image having a width and a height and stored in a first array in computer memory, said image being expanded by a plurality of data elements in width and height, comprising the steps of:

a) separating said first array stored in computer memory into a plurality of rows, each row having a first plurality of data elements equal to the width of the image such that each row is one element in height, each element having a multiple bit value; and b) separately expanding each row from a first plurality of data elements in said first array to a second plurality of data elements in a second array stored in computer memory, said second plurality of data elements being generated in sequential order, each element having a multiple bit value, including for generating each of said second plurality of data elements in sequential order the steps of:

i) correlating each of said first plurality of data elements to at least one of said second plurality of data elements;

ii) distributing the value of selected elements of said first plurality of data elements to correlated data elements of said second plurality of data elements, said step of distributing includes distributing the value of elements at ends of each row of said first array to correlated elements at ends of each row of said second array; and iii) averaging values for each of the elements of the second plurality of data elements that were not distributed values of selected elements of said first plurality of data elements.

2. The method of claim 1 further comprising the steps of:

a) separating said second array stored in computer memory into a plurality of columns, each column having a third plurality of data elements equal to the height of the image such that each column is one element in width, each element having a multiple bit value; and b) separately expanding each column from a third plurality of data elements in said second array to a fourth plurality of data elements in a third array stored in computer memory, said fourth plurality of data elements being generated in sequential order, each element having a multiple bit value, including for generating each of said fourth plurality of data elements in sequential order the steps of:

i) correlating each of said third plurality of data elements to at least one of said fourth plurality of data elements;

ii) distributing the value of selected elements of said third plurality of data elements to correlated data elements of said fourth plurality of data elements, said step of distributing includes distributing the value of elements at ends of each column of said second array to correlated elements at ends of each column of said third array; and iii) averaging values for each of the elements of the second and fourth plurality of data elements that were not distributed values of selected elements of said first and third plurality of data elements.

3. The method of claim 2 wherein said second plurality of elements is not equal to said fourth plurality of data elements.

4. The method of claim 3 wherein said second and fourth plurality of data elements are not respectively multiples of said first and third plurality of data elements.

5. An apparatus for expanding an image having a width and a height and stored in a first array in computer memory, said image being expanded by a plurality of data elements in width and height, comprising:
  a) means for separating said first array stored in computer memory into a plurality of rows, each row having a first plurality of data elements equal to the width of the image such that each row is one element in height, each element having a multiple bit value; and
  b) means for separately expanding each row from a first plurality of data elements in said first array to a second plurality of data elements in a second array stored in computer memory, said second plurality of data elements being generated in sequential order, each element having a multiple bit value, including for generating each of said second plurality of data elements in sequential order:
    i) means for correlating each of said first plurality of data elements to at least one of said second plurality of data elements;
    ii) means for distributing the value of selected elements of said first plurality of data elements to correlated data elements of said second plurality of data elements, said means for distributing includes means for distributing the value of elements at ends of each row of said first array to correlated elements at ends of each row of said second array; and
    iii) means for averaging values for each of the elements of the second plurality of data elements that were not distributed values of selected elements of said first plurality of data elements.

6. The apparatus of claim 5 further comprising:
  a) means for separating said second array stored in computer memory into a plurality of columns, each column having a third plurality of data elements equal to the height of the image such that each column is one element in width, each element having a multiple bit value; and
  b) means for separately expanding each column from a third plurality of data elements in said second array to a fourth plurality of data elements in a third array stored in computer memory, said fourth plurality of data elements being generated in sequential order, each element having a multiple bit value, including for generating each of said fourth plurality of data elements in sequential order:
    i) means for correlating each of said third plurality of data elements to at least one of said fourth plurality of data elements;
    ii) means for distributing the value of selected elements of said third plurality of data elements to correlated data elements of said fourth plurality of data elements, said means for distributing includes means for distributing the value of elements at ends of each column of said second array to correlated elements at ends of each column of said third array; and
    iii) means for averaging values for each of the elements of the second and fourth plurality of data elements that were not distributed values of selected elements of said first and third plurality of data elements.

7. The apparatus of claim 6 wherein said second plurality of elements is not equal to said fourth plurality of data elements.

8. The apparatus of claim 7 wherein said second and fourth plurality of data elements are not respectively multiples of said first and third plurality of data elements.

9. A data processing system for expanding an image having a width and a height and stored in a first array, said image being expanded by a plurality of data elements in width and height, comprising:
  a) a processor for processing data;
  b) a memory for storing data to be processed;
  c) means for separating said first array into a plurality of rows, each row having a first plurality of data elements equal to the width of the image such that each row is one element in height, each element having a multiple bit value; and
  d) means for separately expanding each row from a first plurality of data elements in said first array to a second plurality of data elements in a second array, said second plurality of data elements being generated in sequential order, each element having a multiple bit value, including for generating each of said second plurality of data elements in sequential order:
    i) means for correlating each of said first plurality of data elements to at least one of said second plurality of data elements;
    ii) means for distributing the value of selected elements of said first plurality of data elements to correlated data elements of said second plurality of data elements, said means for distributing includes means for distributing the value of elements at ends of each row of said first array to correlated elements at ends of each row of said second array; and
    iii) means for averaging values for each of the elements of the second plurality of data elements that were not distributed values of selected elements of said first plurality of data elements.

10. The data processing system of claim 9 further comprising:
  a) means for separating said second array into a plurality of columns, each column having a third plurality of data elements equal to the height of the image such that each column is one element in width, each element having a multiple bit value; and
  b) means for separately expanding each column from a third plurality of data elements in said second array to a fourth plurality of data elements in a third array, said fourth plurality of data elements being generated in sequential order, each element having a multiple bit value, including for generating each of said fourth plurality of data elements in sequential order:
    i) means for correlating each of said third plurality of data elements to at least one of said fourth plurality of data elements;
    ii) means for distributing the value of selected elements of said third plurality of data elements to correlated data elements of said fourth plurality of data elements, said means for distributing includes means for distributing the value of elements at ends of each column of said second array to correlated elements at ends of each column of said third array; and
    iii) means for averaging values for each of the elements of the second and fourth plurality of data elements that were not distributed values of selected elements of said first and third plurality of data elements.

11. The data processing system of claim 10 wherein said second plurality of elements is not equal to said fourth plurality of data elements.

12. The data processing system of claim 11 wherein said second and fourth plurality of data elements are not respectively multiples of said first and third plurality of data elements.

13. A computer programming means residing on a computer readable medium executable by a processor for instructing a data processing system to expand an image having a width and a height and stored in a first array in data processing system memory, said image being expanded by a plurality of data elements in width and height, comprising:
   a) means for instructing the data processing system to separate said first array stored in data processing system memory into a plurality of rows, each row having a first plurality of data elements equal to a width of the image such that each row is one element in height, each element having a multiple bit value; and
   b) means for instructing the data processing system to separately expand each row from a first plurality of data elements in said first array to a second plurality of data elements in a second array stored in data processing system memory, said second plurality of data elements being generated in sequential order, each element having a multiple bit value, including for generating each of said second plurality of data elements in sequential order:
      i) means for instructing the data processing system to correlate each of said first plurality of data elements to at least one of said second plurality of data elements;
      ii) means for instructing the data processing system to distribute the value of selected elements of said first plurality of data elements to correlated data elements of said second plurality of data elements, said means for instructing includes means for instructing the data processing system to distribute the value of elements at ends of each row of said first array to correlated elements at ends of each row of said second array; and
      iii) means for instructing the data processing system to average values for each of the elements of the second plurality of data elements that were not distributed values of selected elements of said first plurality of data elements.

14. The computer programming means of claim 13 further comprising:
   a) means for instructing the data processing system to separate said second array stored in data processing system memory into a plurality of columns, each column having a third plurality of data elements equal to the height of the image such that each column is one element in width, each element having a multiple bit value; and
   b) means for instructing the data processing system to separately expand each column from a third plurality of data elements in said second array to a fourth plurality of data elements in a third array stored in data processing system memory, said fourth plurality of data elements being generated in sequential order, each element having a multiple bit value, including for generating each of said fourth plurality of data elements in sequential order:
      i) means for instructing the data processing system to correlate each of said third plurality of data elements to at least one of said fourth plurality of data elements;
      ii) means for instructing the data processing system to distribute the value of selected elements of said third plurality of data elements to correlated data elements of said fourth plurality of data elements, said means for instructing includes means for instructing the data processing system to distribute the value of elements at ends of each column of said second array to correlated elements at ends of each column of said third array; and
      iii) means for instructing the data processing system to average values for each of the elements of the second and fourth plurality of data elements that were not distributed values of selected elements of said first and third plurality of data elements.

15. The computer programming means of claim 14 wherein said second plurality of elements is not equal to said fourth plurality of data elements.

16. The computer programming means of claim 15 wherein said second and fourth plurality of data elements are not respectively multiples of said first and third plurality of data elements.

* * * * *